United States Patent [19]

Mizuoka

[11] Patent Number: 5,553,169
[45] Date of Patent: Sep. 3, 1996

[54] POSITION DETECTING DEVICE USING RUN POSITION AND RUN LENGTH OF NORMALIZED PROJECTION DATA

[75] Inventor: Seiji Mizuoka, Katano, Japan

[73] Assignee: Matsushita Electric Industrial Co., Ltd., Osaka-fu, Japan

[21] Appl. No.: 925,420

[22] Filed: Aug. 10, 1992

Related U.S. Application Data

[63] Continuation of Ser. No. 644,732, Jan. 18, 1991, abandoned.

[30] Foreign Application Priority Data

Jan. 22, 1990 [JP] Japan .................................. 2-12942

[51] Int. Cl.⁶ .................................................. G06K 9/20
[52] U.S. Cl. .......................................................... 382/282
[58] Field of Search ............................. 382/848, 56, 141, 382/282, 232; 358/261.1, 458; G06K 9/00, 9/20, 9/36, 9/46; H04N 1/04, 1/40

[56] References Cited

U.S. PATENT DOCUMENTS

| | | | |
|---|---|---|---|
| 4,673,977 | 6/1987 | Stelzenmueller | 358/261.1 |
| 4,750,212 | 6/1988 | Yokomizo | 382/56 |
| 4,821,336 | 4/1989 | Roye | 382/56 |
| 4,912,559 | 3/1990 | Ariyoshi et al. | 358/261.1 |

FOREIGN PATENT DOCUMENTS 63-16793  4/1988  Japan .

*Primary Examiner*—Jose L. Couso
*Attorney, Agent, or Firm*—Wenderoth, Lind & Ponack

[57] ABSTRACT

A position recognizing device receives and stores image information denoting tones or gradations of an image of a target object. Projection data is synthesized from the image information and the projection data is normalized using a maximum value thereof. A run position and a run length of the normalized projection data at a predetermined slice level are detected, and a position of the target device is detected based on the run position and the run length.

8 Claims, 3 Drawing Sheets

(a)

(b)

(a)

(b)

POSITION DETECTING DEVICE USING RUN POSITION AND RUN LENGTH OF NORMALIZED PROJECTION DATA

This application is a continuation of now abandoned application, Ser. No. 07/644,732, filed Jan. 18, 1991 now abandoned.

BACKGROUND OF THE INVENTION

1. Field of the Invention

The present invention relates to a position recognizing device and more particularly to a position recognizing device suited for assisting in precise mounting of IC component parts successively on a substrate by detecting a position of leads of each of the component parts.

2. Description of the Prior Art

A prior art position recognizing device used in an IC component mounting machine is designed so that an image of varying gradation obtained by viewing an IC component with a television camera is converted into image data which are subsequently stored in a storage unit and a template matching method is then applied to the image data to detect the position of two corners at tips of the leads, to thereby recognize the position of the leads.

In other words, as shown in FIGS. 5 and 6, a video signal carrying an image of an IC component 31 outputted from a television camera 32 is coinverted into binary image data by digitizing the video signal at a predetermined slice level using a digitizing means 33, and the binary image data are subsequently stored in an image storage unit 37. The image data so stored are sequentially transferred in response to instructions issued by a control unit 37 from the image storage unit 34 to a matching unit 35 in which a matching is carried out between templates 38a and 38b, outputted from a templet storage unit 36, with two corners at the tips of the leads of the IC component 31, which are carried by the image data, so that position information indicative of the point at which they match each other can be supplied to the control unit 37. In response to this position information supplied from the matching unit 35, the control unit 37 recognizes the position of the leads 39.

However, the foregoing system has been found suffer a drawback where the position of an IC component having leads extending outwardly in four directions is to be recognized using an image carried by rays of light reflected therefrom. Specifically, since the leads are so small in size as to result in bending thereof and the reflectance of light tends to vary depending on even a slight inclination of the IC component and the bending of the leads to such an extent as to vary the density of the image, the extent to which the digitized image data and the templet are matched with each other may be lowered, resulting in a difficulty in recognition of the position of the leads.

As a different position recognizing method, there is also known a method in which projection data of the image information are formed so that the run position and the run length at a predetermined slice level can be detected. Even this different position recognizing method suffers a drawback similar to that occurring in a pattern matching, particularly where the image density varies. Also, since the leads are generally of a shape in which, as shown in FIGS. 5 and 6, having respective portions intermediate of their length that are bent so as to represent a generally gull-wing shape, the projection data tend to considerably vary at positions corresponding to the bent portions of the leads and, therefore, it often occurs that the run and the lead do not match in shape with each other. Therefore, the different position recognizing method is not applied in practice for the position recognition of the leads.

SUMMARY OF THE INVENTION:

The present invention has been devised with a view to substantially eliminating the above discussed drawbacks and has for its object to provide an improved position recognizing device effective to assuredly recognize the position of a target object to be recognized even when the density of an image of the target object varies.

In order to accomplish the above described object, the present invention provides an improved position recognizing device which comprises an input means for inputting tone or gradation information of an image of the target object, a storage means for storing the image information, a data synthesizing means for synthesizing projection data on the basis of the image information, a normalizing means for normalizing the projection data using a maximum value thereof, a run detecting means for detecting a run position and a run length of the normalized projection data at a predetermined slice level, and a position detecting means for detecting a position on the basis of the run position and the run length.

In the practice of the present invention, the run detecting means may be designed so as to detect the run position and the run length, or the sum thereof, by progressively lowering the slice level relative to the projection data, and the position detecting means may be designed so as to detect the position in reference to an average value of the run position and the run length at locations where the run length of a value greater than a predetermined length, or the sum thereof, can be detected continuously over a predetermined number of times among various slice levels.

Also, instead of normalizing the projection data with the use of the maximum value thereof, an arrangement may be made in which the slice level is set using a value obtained by dividing the maximum value of the projection data with a normalizing constant.

According to the present invention, even though the image density of the target object varies, the normalization of the image information thereof using the maximum value thereof is effective to provide the projection data wherein a factor associated with the variation in tone or gradation has been eliminated. Since with the device of the present invention the position is recognized using the run position and the run length based on the projection data, the position recognition can be accomplished satisfactorily and stably.

Also, when the position recognition is carried out in reference to an average value of the run position and the run length at locations where the run length of a value greater than a predetermined length, or the sum thereof, can be detected continuously over a predetermined number of times among various slice levels, while the slice level is progressively lowered relative to the projection data.

Again, the same is true even when the slice level is set using the value obtained by dividing the maximum value of the projection data with the normalizing constant, instead of normalizing the projection data using the maximum value thereof.

BRIEF DESCRIPTION OF DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Hereinafter, a position recognizing device according to a preferred embodiment of the present invention will be described with reference to FIGS. 1 to 4.

Figure 1:
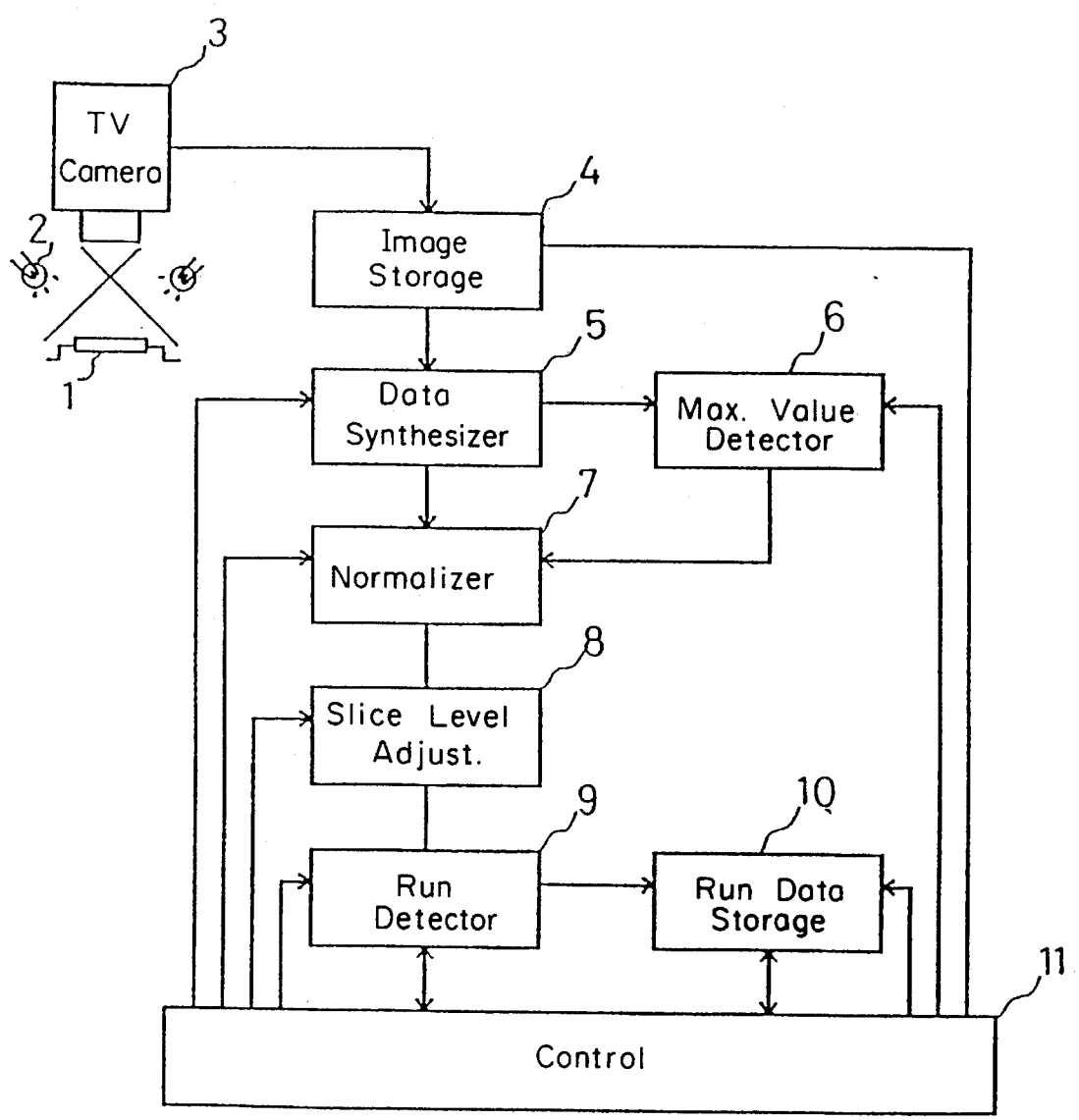
FIG. 1 is a circuit block diagram showing a position recognizing device embodying the present invention.

Referring first to FIG. 1 showing a structure of the position recognizing device, reference numeral 1 represents a target object to be recognized such as, for example, an IC component of a type having leads extending outwardly therefrom in four directions. The target object 1 is illuminated by an illuminator lamp 2 positioned thereabove, and an image of the target object carried by imagewise rays of light reflected from the target object are viewed by a television camera positioned thereabove.

Figure 2:
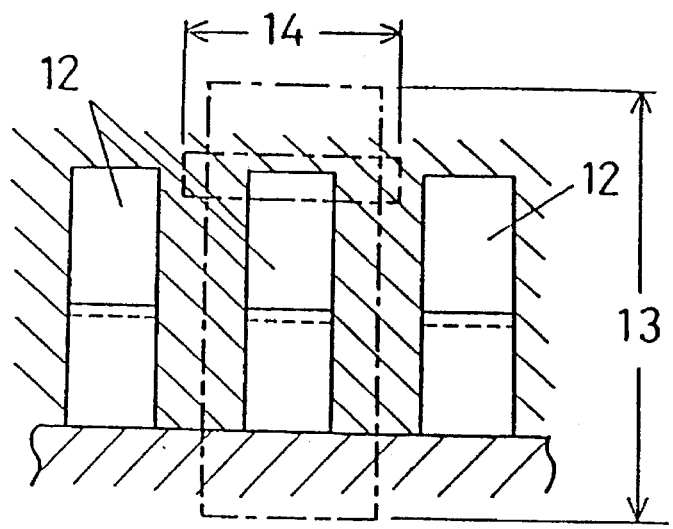
FIG. 2 is an explanatory diagram showing an example of setting of a portion where projection data are formed.
Figure 3:
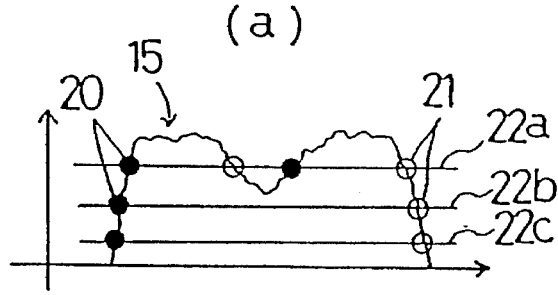
FIGS. 3(a) and 3(b) are explanatory charts used to explain the projection data.
Figure 3:
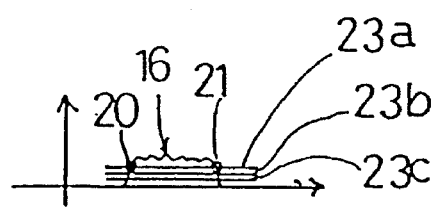
Figure 4:
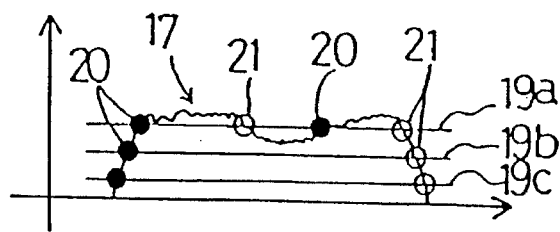
FIGS. 4(a) and 4(b) are explanatory charts used to explain the projection data which have been normalized.
Figure 4:
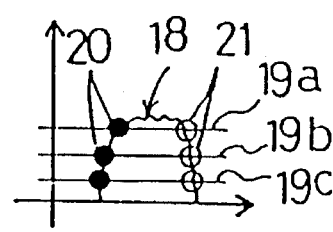
Figure 5:
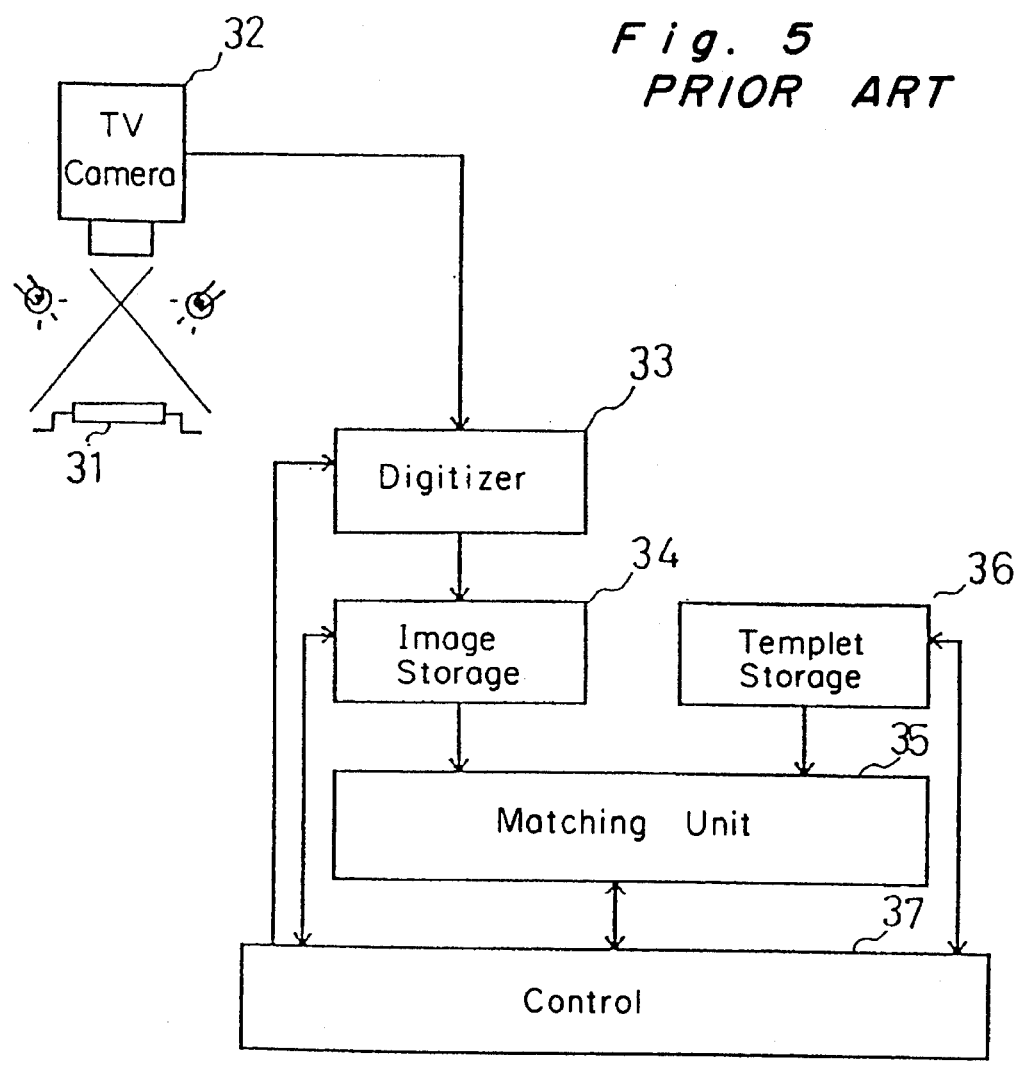
FIG. 5 is a circuit block diagram showing the prior art position recognizing device.
Figure 6:
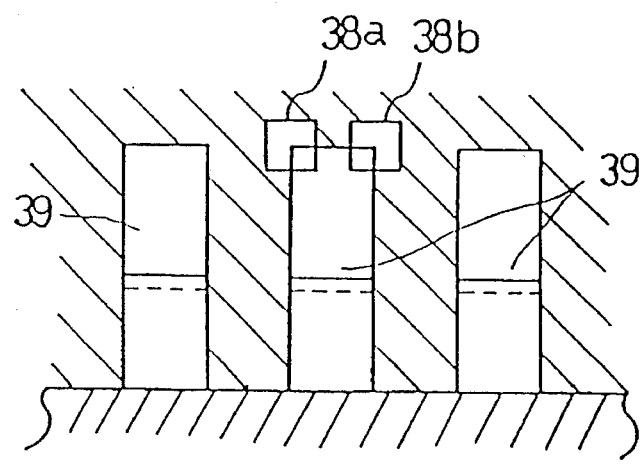
FIG. 6 is an explanatory diagram used to explain the templet matching method.

A video signal outputted from the television camera 3 stored in an image storage unit 4 in the form of tone image information. Only a required portion of the image information stored in the image storage unit 4 is extracted therefrom under instructions from a control unit 11 and is utilized by a data synthesizing unit 5 to form projection data. By way of example, where the respective positions of predetermined leads 12 of the IC component as shown in FIG. 2 are desired to be recognized a lengthwise detecting portion 13 for the detection of the positions in a lengthwise direction thereof and a widthwise detecting portion 14 for the detection of the positions in a widthwise direction thereof are set and image information corresponding to those portions are extracted to form respective projection data 15 and 16 as shown in FIGS. 8(a) and 3(b), respectively.

The projection data 15 and 16 so formed are supplied to a maximum value detecting unit 6 at which a maximum value is detected, and the detected maximum value is subsequently utilized by a normalizing unit 7 to normalize the projection data 15 and 16 to represent such as shown in FIGS. 4(a) and 4(b), respectively. By progressively lowering a slice level as the normalized projection data 17 and 18 are supplied to a slice level adjusting unit 8, the projection data which have been sliced at various slice levels 19a to 19c are sequentially supplied to a sequential run detecting unit 9 and a start point 20 (shown by ●) and an end point 21 (shown by o) of the run for each slice level and the run length therebetween are stored in a run data storage unit 10.

The control unit 11, upon receipt of the run data stored in the run data storage unit 10, progressively lowers the slice level in a manner as described above until the run lengths greater than a predetermined run length, or the sum thereof, are detected continuously over a predetermined number of times at each slice level and when the run lengths greater than the predetermined run length has been detected continuously over the predetermined number of times, the control unit 11 recognizes the respective positions of the leads 12 in reference to an average value of the run position and the run length at such locations where they have been detected continuously over the predetermined number of times.

In the figure, for the purpose of clarity, only three slice levels 19a to 19c are shown spaced an exaggerated distance apart from each other. However, in practice, the slice levels are lowered at minute intervals and, at the time the run lengths greater than the predetermined run length, or the sum thereof, have been detected continuously over 10 times, the positions are detected using an average value thereof. Also, with respect to the run data in which there is an interrupting point and the sum of the run lengths is greater than a predetermined length, a data processing is performed by neglecting the end point 21 and the start point of an intermediate portion thereof so that the interval between the start point 20 and the end point 21 at each of the opposite ends thereof can be used as a run length.

According to the foregoing embodiment of the present invention, the provision of the projection data synthesizing unit 5 for synthesizing the projection data of the tone image information and the normalizing unit 7 for normalizing the projection data with the use of the maximum value thereof is effective to stabilize the sensitivity of detection due to the normalization even though the density of the projection data is not fixed and also to recognize the positions of the leads stably even where the image density varies. Accordingly, even when the density of the image varies as a result of a change in reflectance resulting from the inclination of the IC component and/or the bending of the leads, the recognition of the positions of the leads can be accomplished without being adversely affected by the change in density.

Also, since portions of the tone image information with which the projection data are formed are set for each lead 12, the projection data can be normalized for each lead using the maximum value of the projection data and, therefore, the recognition of the positions of the leads can be accomplished without being adversely affected by a variation in density for each lead While in the foregoing embodiment the projection data have been described as normalized using the maximum value of the projection data 15 and 6, arrangement may be made that the slice levels 22a to 22c and 23a to 23c relative to the projection data 15 and 16, respectively, may be set using respective values obtained by dividing the maximum values of the projection date with a normalizing constant.

Thus, according to the present invention, even where the image density of the target object varies, the normalization of the image information thereof using the maximum value thereof is effective to provide the projection data wherein a factor associated with the variation in tone or gradation has been eliminated. Since with the device of the present invention the position is recognized using the run position and the run length based on the projection data, the position recognition can be accomplished satisfactorily and stably.

Also, when the position recognition is carried out in reference to an average value of the run position and the run length at locations where the run length of a value greater than a predetermined length, or the sum thereof, can be detected continuously over a predetermined number of times among various slice levels, while the slice level is progressively lowered relative to the projection data.

Furthermore, similar effects can be obtained even when the slice level is set using the value obtained by dividing the maximum value of the projection data with the normalizing constant, instead of normalizing the projection data using the maximum value thereof.

Although the present invention has been fully described in connection With the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A position recognizing device for recognizing the position of a three-dimensional target object, comprising:

an image pick-up device for viewing the three-dimension target object to obtain a two-dimensional image of the target object and for generating corresponding image information denoting tones or gradations of the two-dimensional image of the three-dimensional target object;

storage means for storing the image information generated by said image pick up device;

data synthesizing means for synthesizing first and second projection data from the image information stored in said storage means, the first and second projection data denoting image information along respective first and second axes of the two-dimensional image of the target object;

normalizing means for determining a normalizing constant from respective maximum values of the first and second projection data synthesized by said data synthesizing means and for setting first and second slice intervals by dividing the respective maximum values of the first and second projection data by the normalizing constant;

run detecting means for detecting a run position and a run length of each of the first and second projection data at first and second slice levels corresponding to the respective first and second since intervals set by said normalizing means; and position detecting means for detecting a position of the three-dimensional target object based on the run position and the run length of each of the first and second projection data.

2. The device as claimed in claim 1, wherein the run detecting means progressively lowers each or said first and second slice levels by the first and second slice intervals respectively, and detects the run position add the run length, or a sum of run lengths of the first and second projection data at each of the progressively lowered first and second slice intervals, and wherein the position detecting means detects the position of the target object with reference to an average value of the run position and the run length of each of the first and second projection data at locations where a run length of a value greater than a predetermined length, or the sum thereof, of each of the first and second projection data is detected continuously over a predetermined number of times among the progressively lowered first and second slice levels.

3. The device as claimed in claim 1, wherein the image pick-up device includes illumination means for illuminating the target object.

4. The device as claimed in claim 2, wherein the image pick-up device includes illumination means for illuminating the target object.

5. The device as claimed in claim 1, wherein the image pick-up device includes a camera.

6. The device as claimed in claim 2, wherein the image pick-up device includes a camera.

7. The device as claimed in claim 3, wherein the image pick-up device further includes a camera.

8. The device as claimed in claim 4, wherein the image pick-up device further includes a camera.

* * * * *